(12) United States Patent
Seo et al.

(10) Patent No.: US 9,454,246 B2
(45) Date of Patent: Sep. 27, 2016

(54) MULTI-FUNCTIONAL PEN AND METHOD FOR USING MULTI-FUNCTIONAL PEN

(75) Inventors: Seong-Min Seo, Hwaseong-si (KR); Jeong-Seok Lee, Anyang-si (KR); In-Kuk Yun, Suwon-si (KR); Po-Ra Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 328 days.

(21) Appl. No.: 12/984,179

(22) Filed: Jan. 4, 2011

(65) Prior Publication Data

US 2011/0164001 A1 Jul. 7, 2011

(30) Foreign Application Priority Data

Jan. 6, 2010 (KR) ........................ 10-2010-0001016

(51) Int. Cl.
G06F 3/033 (2013.01)
G06F 3/0354 (2013.01)
G06F 3/038 (2013.01)

(52) U.S. Cl.
CPC ........... *G06F 3/03545* (2013.01); *G06F 3/038* (2013.01); *G06F 2203/0337* (2013.01); *G06F 2203/0384* (2013.01)

(58) Field of Classification Search
CPC ............... G06F 3/03545; G06F 3/038; G06F 2203/0337; G06F 2203/0384
USPC ..................... 345/173–184; 178/18.01–20.03
See application file for complete search history.

(56) References Cited

U.S. PATENT DOCUMENTS

| | | | | |
|---|---|---|---|---|
| 6,002,387 A * | 12/1999 | Ronkka | ................. | G06F 3/0488 345/157 |
| 6,252,948 B1 * | 6/2001 | Okamoto | ............... | H04M 11/00 345/173 |
| 6,577,299 B1 * | 6/2003 | Schiller | ................. | G06F 3/0325 345/158 |
| 7,231,181 B2 * | 6/2007 | Kohli | .................. | H04M 1/0202 345/179 |
| 7,385,595 B2 * | 6/2008 | Bryborn | ................ | G06F 3/0317 178/18.01 |
| 7,522,158 B2 * | 4/2009 | Carlson | ................. | G06F 1/1626 342/465 |

(Continued)

FOREIGN PATENT DOCUMENTS

| | | |
|---|---|---|
| CN | 1316344 | 5/2007 |
| CN | 101093426 | 12/2007 |

(Continued)

OTHER PUBLICATIONS

Korean Office Action dated Aug. 19, 2015 issued in counterpart application No. 10-2010-0001016, 7 pages.

(Continued)

*Primary Examiner* — Kumar Patel
*Assistant Examiner* — Vinh Lam
(74) *Attorney, Agent, or Firm* — The Farrell Law Firm, P.C.

(57) ABSTRACT

A multi-functional pen apparatus and a method for using the multi-functional pen are provided. The method includes switching an operation mode of the multi-functional pen to a pen mode according to a predetermined key input; receiving pen data in the switched pen mode; and transmitting the pen data to a portable terminal, wherein the portable terminal transmits a call based on the transmitted pen data.

13 Claims, 15 Drawing Sheets

(56) References Cited

U.S. PATENT DOCUMENTS

| | | | |
|---|---|---|---|
| 7,577,428 B2* | 8/2009 | Lapstun | B41J 3/445 178/18.01 |
| 7,663,509 B2* | 2/2010 | Shen | G06F 3/03545 341/20 |
| 7,773,984 B2* | 8/2010 | Lapstun | B41J 3/445 178/18.01 |
| 7,783,280 B2* | 8/2010 | Lapstun | B41J 3/445 178/19.01 |
| 8,022,943 B2* | 9/2011 | Silverbrook | G06F 3/014 178/18.01 |
| 8,059,108 B2* | 11/2011 | Carlson | G06F 1/1626 342/465 |
| 8,194,045 B1* | 6/2012 | Maloney | G06Q 10/00 345/173 |
| 2001/0024193 A1* | 9/2001 | Fahraeus | G06F 3/0317 345/173 |
| 2002/0056576 A1* | 5/2002 | Ericson | G06F 3/0317 178/18.01 |
| 2003/0011578 A1* | 1/2003 | Bergovist | G06F 3/03545 345/179 |
| 2003/0146907 A1* | 8/2003 | Boals | G06F 3/03545 345/179 |
| 2003/0195819 A1* | 10/2003 | Chen | G06Q 20/02 705/26.35 |
| 2006/0046650 A1* | 3/2006 | Kohli | H04M 1/0202 455/41.2 |
| 2006/0119591 A1* | 6/2006 | Ericson | G06F 3/03545 345/179 |
| 2007/0106506 A1* | 5/2007 | Ma | H04M 1/271 704/231 |
| 2007/0159362 A1 | 7/2007 | Shen | |
| 2007/0176909 A1* | 8/2007 | Pavlowski | G06F 3/03545 345/179 |
| 2008/0094377 A1* | 4/2008 | Zander | G06F 3/03545 345/179 |
| 2008/0179113 A1* | 7/2008 | Carlson | G06F 1/1626 178/19.01 |
| 2008/0198146 A1* | 8/2008 | Bryborn | G06F 3/0317 345/179 |
| 2008/0204429 A1* | 8/2008 | Silverbrook | G06F 3/014 345/179 |
| 2009/0009489 A1* | 1/2009 | Lee | G06F 3/03545 345/179 |
| 2009/0251336 A1 | 10/2009 | Marggraff et al. | |
| 2009/0251338 A1* | 10/2009 | Marggraff | G06K 9/228 341/20 |
| 2009/0314552 A1 | 12/2009 | Underwood et al. | |
| 2010/0281435 A1* | 11/2010 | Bangalore | G06F 3/04883 715/863 |
| 2010/0289776 A1* | 11/2010 | Bryborn Krus | G06F 3/03545 345/179 |
| 2010/0306705 A1* | 12/2010 | Nilsson | G06F 3/0488 715/835 |
| 2010/0330912 A1* | 12/2010 | Saila | G01S 3/7864 455/41.3 |
| 2011/0130159 A1* | 6/2011 | Chen | G06F 3/0317 455/466 |
| 2011/0151929 A1* | 6/2011 | Schmehl et al. | 455/557 |
| 2011/0175842 A1* | 7/2011 | Miura | G06F 3/044 345/173 |
| 2011/0223973 A1* | 9/2011 | Li | G06F 3/0346 455/564 |
| 2012/0127110 A1* | 5/2012 | Amm | G06F 3/03545 345/174 |
| 2013/0120463 A1* | 5/2013 | Harris | G06F 3/04883 345/661 |
| 2013/0321314 A1* | 12/2013 | Oh et al. | 345/173 |

FOREIGN PATENT DOCUMENTS

| | | |
|---|---|---|
| CN | 101202569 | 6/2008 |
| CN | 101346684 | 1/2009 |
| KR | 1020060018294 | 3/2006 |

OTHER PUBLICATIONS

European Search Report dated Oct. 20, 2014 issued in counterpart application No. 10195265.3-1959.

Chinese Office Action dated Feb. 27, 2015 issued in counterpart application No. 201110001842.5.

* cited by examiner

MULTI-FUNCTIONAL PEN AND METHOD FOR USING MULTI-FUNCTIONAL PEN

PRIORITY

This application claims priority under 35 U.S.C. §119 to a Korean Patent application filed in the Korean Intellectual Property Office on Jan. 6, 2010 and assigned Ser. No. 10-2010-0001016, the contents of which are incorporated herein by reference.

BACKGROUND OF THE INVENTION

1. Field of the Invention

The present invention relates generally to a multi-functional pen, and in particular, to an apparatus and method for a multi-functional pen providing functions such as a character input function, a mouse function, and a headset function.

2. Description of the Related Art

A portable terminal, such as a cellular phone, a Personal Digital Assistant (PDA), an e-book, or a smart phone, provides various functions, such as a wireless Internet function, an electronic scheduler function, a multimedia capturing/playing function, a game function, etc., in addition to a general communication function.

In order to conveniently and efficiently use such a portable terminal, an input device for easily accessing and using various functions of the portable terminal, such as the above-described functions, is required.

SUMMARY OF THE INVENTION

An object of the present invention is to substantially solve at least the above problems and/or disadvantages and to provide at least the advantages below. Accordingly, an object of the present invention is to provide a pen-type input apparatus for easily accessing and using various functions of a portable terminal.

According to one aspect of the present invention, a method for using a multi-functional pen is provided. The method includes switching an operation mode of the multi-functional pen to a pen mode according to a predetermined key input; receiving pen data in the switched pen mode; and transmitting the pen data to a portable terminal, wherein the portable terminal transmits a call based on the transmitted pen data.

According to another aspect of the present invention, a multi-functional pen is provided. The multi-functional pen includes a lower case; a pen tip compartment for mounting a pen tip on one end of the lower case in a lengthwise direction; left and right cases assembled with the lower case; an optical module disposed between the pen tip and the left and right cases; and an outer case assembly assembled with the lower case to enclose outer surfaces of the left and right cases and the optical module.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention are described herein below with reference to the accompanying drawings.

Figure 1:
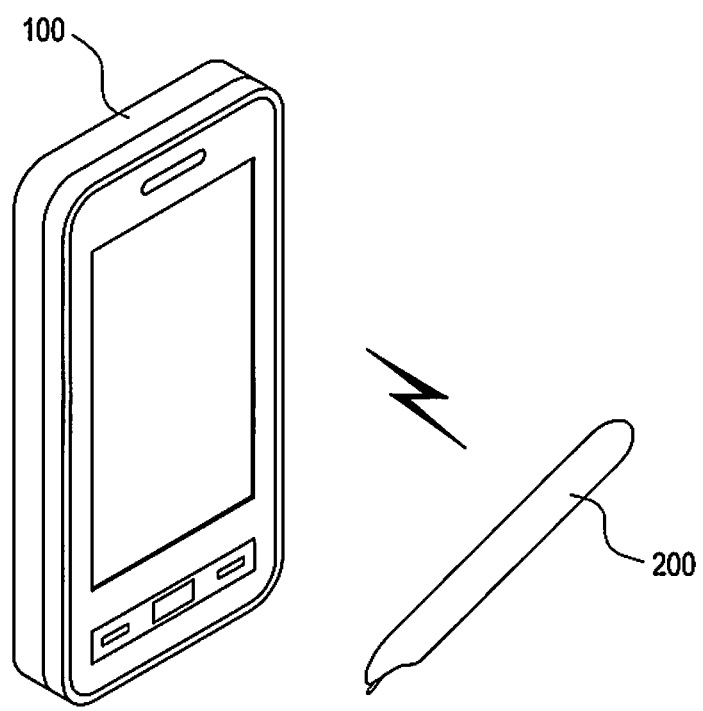
FIG. 1 is a diagram illustrating a portable terminal and a multifunctional pen, such that the portable terminal is connected to the multi-functional pen by a local area wireless communication according to an embodiment of the present invention.

FIG. 1 is a diagram illustrating a portable terminal and a multi-functional pen, such that the portable terminal 100 is connected to the multi-functional pen 200 by a local area wireless communication according to an embodiment of the present invention.

The portable terminal 100 according to an embodiment of the present invention is a terminal for providing a communication function. The portable terminal 100 may be a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player, a mobile broadcasting receiver such as a Digital Multimedia Broadcasting (DMB) receiver, a Personal Computer (PC), a desktop computer, a laptop computer, etc.

The portable terminal 100 and the multi-functional pen 200 can exchange data through a communication connection using a local area wireless communication, such as communications according to BLUETOOTH® or ZIGBEE® protocols, for example. Herein, "Bluetooth" and "Zigbee" refer to devices and/or communications compliant with BLUETOOTH® and ZIGBEE® protocols, respectively. The multi-functional pen 200 is described in further detail as follows with reference to FIGS. 2 and 3.

Figure 2:
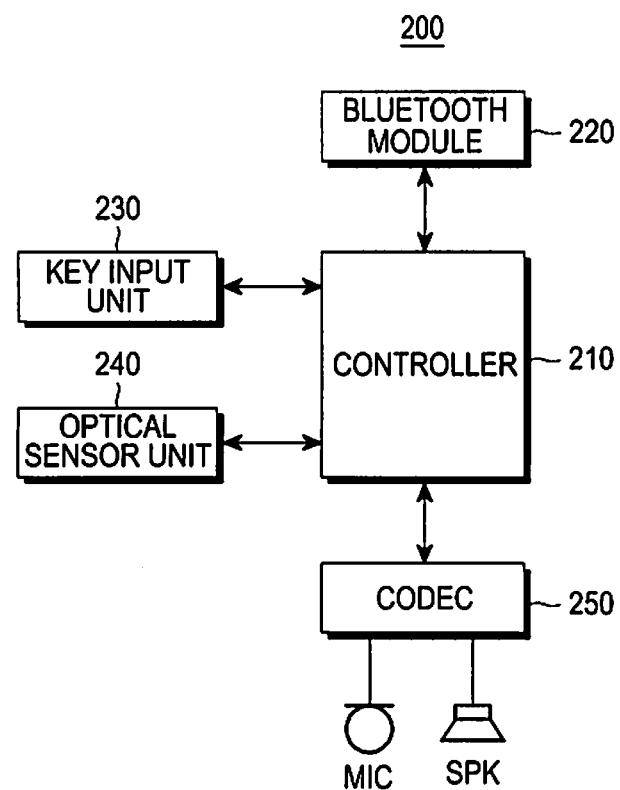
FIG. 2 is a block diagram illustrating the multi-functional pen according to an embodiment of the present invention.

FIG. 2 is a block diagram of the multi-functional pen 200 according to an embodiment of the present invention. Referring to FIG. 2, the multi-functional pen 200 may include a controller 210, a Bluetooth module 220, a key input unit 230, an optical sensor unit 240, a codec 250, and so forth. The multi-functional pen 200 may further include a battery (not illustrated) required for driving the multi-functional pen 200 and a charging circuit (not illustrated) for charging the battery.

Figure 3:
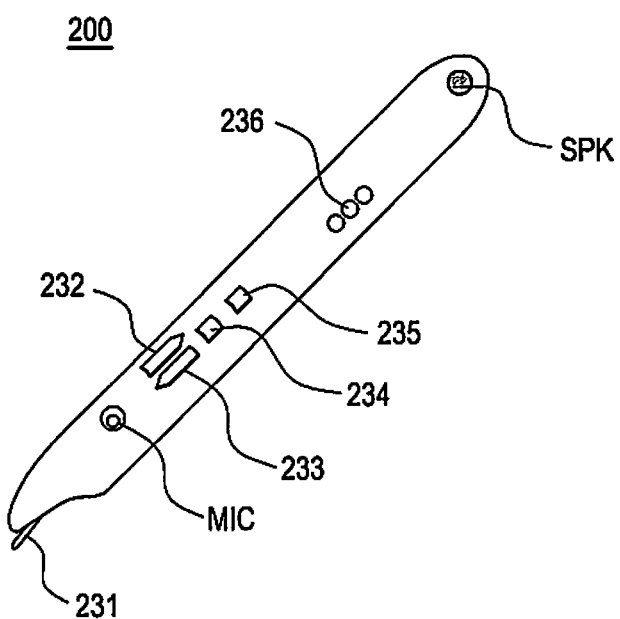
FIG. 3 is a schematic diagram illustrating the multi-functional pen according to an embodiment of the present invention.

FIG. 3 is a schematic diagram of the multi-functional pen 200 according to an embodiment of the present invention. The controller 210 controls a general operation of the multi-functional pen 200. The controller 210 determines an operation mode of the multi-functional pen 200 and controls the multi-functional pen 200 to operate in correspondence with the determined corresponding mode. For example, the controller 210 can determine an operation mode in which the multi-functional pen 200 is operating, which may be selected from among modes including an idle mode, a pen mode, a mouse mode, and a headset mode, for example. The pen mode corresponds to a function for inputting characters with the multi-functional pen 200, the mouse mode corresponds to a function for using the multi-functional pen 200 as a mouse by controlling a mouse pointer with the multi-functional pen 200, and the headset mode corresponds to a function for using the multi-functional pen 200 as a wireless headset.

The controller 210 transmits data generated according to an operation mode to the portable terminal 100 through the Bluetooth module 220 in the operation mode (such as any of the idle mode, the pen mode, the mouse mode, and the headset mode), and the portable terminal 100 supports a corresponding operation mode through the received data. For example, if the operation mode is the pen mode, the controller 210 controls an optical sensing signal input from the optical sensor unit 240 to be transmitted to the portable terminal 100 through the Bluetooth module 220, and the portable terminal 100 may use the received optical sensing signal as pen data input from a user and display the pen data on a display unit (not shown) of the portable terminal 100.

The Bluetooth module 220 supports local area wireless communication using an Industrial Scientific Medical (ISM) band of a 2.4 GHz band. The Bluetooth module 220 included in the multi-functional pen 200 performs a series of operations of transmitting and receiving data, such as a predetermined control signal and a predetermined voice signal, by being Bluetooth-communication-connected to a device, such as the portable terminal 100, including a Bluetooth module through paring. The Bluetooth module 220 may receive a control signal from the portable terminal 100 and deliver the control signal to the controller 210. Here, the Bluetooth module 220 may also analyze the control signal received from the portable terminal 100.

Although embodiments of the present invention described herein refer to a Bluetooth module as an example of a local area wireless communication module, other local area wireless communication modules, such as a ZigBee, Ultra Wide Band (UWB), or Radio Frequency IDentification (RFID) module, or any combination, thereof, for forming a communication channel in a local area and transmitting and receiving a signal may be used instead or together with the Bluetooth module, in accordance with embodiments of the present invention. In the present example, it is assumed that the portable terminal 100 includes a local area wireless communication module corresponding to the local area wireless communication module included in the multi-functional pen 200.

The key input unit 230 includes several keys (or buttons) of the multi-functional pen 200 according to an embodiment of the present invention.

The key input unit 230 is described in more detail a follows with reference to FIG. 3. The key input unit 230 according to an embodiment of the present invention includes a microphone MIC, a speaker SPK, a pen tip 231, up/down keys 232 and 233, a call button 234, a mode switch button 235, and at least one Light Emitting Diode (LED) 236.

The microphone MIC and the speaker SPK receive a voice signal of a user and outputs a voice signal of the other party, respectively, when the multi-functional pen 200 according to an embodiment of the present invention operates in the headset mode.

The pen tip 231 may perform a cursor movement function when the multi-functional pen 200 operates in the mouse mode. The pen tip 231 may also perform a function of inputting a stroke of a character when the multi-functional pen 200 operates in the pen mode. When the pen tip 231 is implemented in the form of a physical button performing a switch function, the user may switch an operation mode of the multi-functional pen 200 by controlling a push level of the pen tip 231 of the multi-functional pen 200. For example, the user can input characters by switching an operation mode of the multi-functional pen 200 to the pen mode (i.e., manipulating the multi-functional pen 200 after controlling the push level so that the pen tip 231 can be pushed). For another example, the user can move a cursor displayed on the display unit of the portable terminal 100 by switching an operation mode of the multi-functional pen 200 to the mouse mode (i.e., manipulating the multi-functional pen 200 after controlling the push level so that the pen tip 231 cannot be pushed).

The up/down keys 232 and 233 may be used as keys for raising or reducing an output volume of the speaker SPK when an operation mode of the multi-functional pen 200 is the headset mode. The up/down keys 232 and 233 may also be used as left/right buttons of a mouse for a PC when the operation mode is the mouse mode.

The call button 234 is a button that may be used when a call is transmitted using the multi-functional pen 200. According to an embodiment of the present invention, if the user pushes (e.g., clicks) the call button 234, the controller 210 switches an operation mode of the multi-functional pen 200 to the pen mode, and the user can output a call to a corresponding telephone number by pushing the call button 234 once more after inputting (e.g., writing) the telephone number in the pen mode. When a call is output to the corresponding telephone number by pushing the call button 234 once more, the operation mode of the multi-functional pen 200 may be automatically switched to the headset mode.

According to a modification of the above-described embodiment of the present invention, if the user pushes the call button 234 at least a predetermined number of times (e.g., twice), a call may be output to the most recently called party or a pre-set party. According to additional modification of the above-described embodiment, if the user pushes the call button 234 by selecting a telephone number from a telephone number list displayed on the display unit of the portable terminal 100 using the multi-functional pen 200 operating in the mouse mode, an operation mode of the multi-functional pen 200 may be automatically switched to the headset mode. According to an additional modification of the above-described embodiment of the present invention, the call button 234 may be used as a button for requesting an initial communication connection between the multi-functional pen 200 and the portable terminal 100. For example, when Bluetooth paring is requested by pushing the call button 234, the multi-functional pen 200 is Bluetooth-connected to the portable terminal 100. According to additional modification of the above-described embodiment, operation of the multi-functional pen 200 may be controlled by pushing the call button 234. For example, the multi-functional pen 200 can be turned on or off by pushing the call button 234 for a predetermined duration time (e.g., 1 second).

The mode switch button 235 is a button for switching an operation mode of the multi-functional pen 200, and the user may switch the operation mode of the multi-functional pen 200 in a predetermined order by pushing the mode switch button 235. According to a modification of the above-described embodiment of the present invention, a user may control the operation mode of the multi-functional pen 200 according to the number times of pushing the mode switch button 235. For example, the operation mode of the multi-functional pen 200 may be switched to the pen mode when pushing the mode switch button 235 once, switched to the mouse mode when pushing the mode switch button 235 twice, switched to the headset mode when pushing the mode switch button 235 three times, and switched to the idle mode when pushing the mode switch button 235 four times.

The at least one LED 236 is a kind of an indicator LED and may provide information regarding communication connection/disconnection with the portable terminal 100, data transmission/reception, a call transmission/reception state, a battery state, switching of an operation mode of the multi-functional pen 200, etc. to the user. The information providing function of the LED 236 may be provided by providing a vibration motor instead of or together with the LED 236.

Referring back to FIG. 2, the optical sensor unit 240 senses a motion of the multi-functional pen 200 associated with operations in the pen mode and the mouse mode so that the multi-functional pen 200 according to an embodiment of the present invention can operate in the pen mode and the mouse mode. The optical sensor unit 240 according to an embodiment of the present invention may include a Laser Diode (LD) for radiating light of a predetermined wavelength and a Photo Diode (PD) for receiving reflected light when the radiated light is reflected. Here, the PD may be included in an image sensor for determining the motion of the multi-functional pen 200 by comparing the radiated light with the received light, and the image sensor may also be included in the controller 210 of the multi-functional pen 200.

The codec 250 acquires voice information by digitizing voice of the user input through the microphone MIC, and demodulates voice information of the other party received through the Bluetooth module 220 and outputs the demodulated voice information through the speaker SPK, when the multi-functional pen 200 is in the headset mode. The codec 250 may be included in the controller 210.

Figure 4:
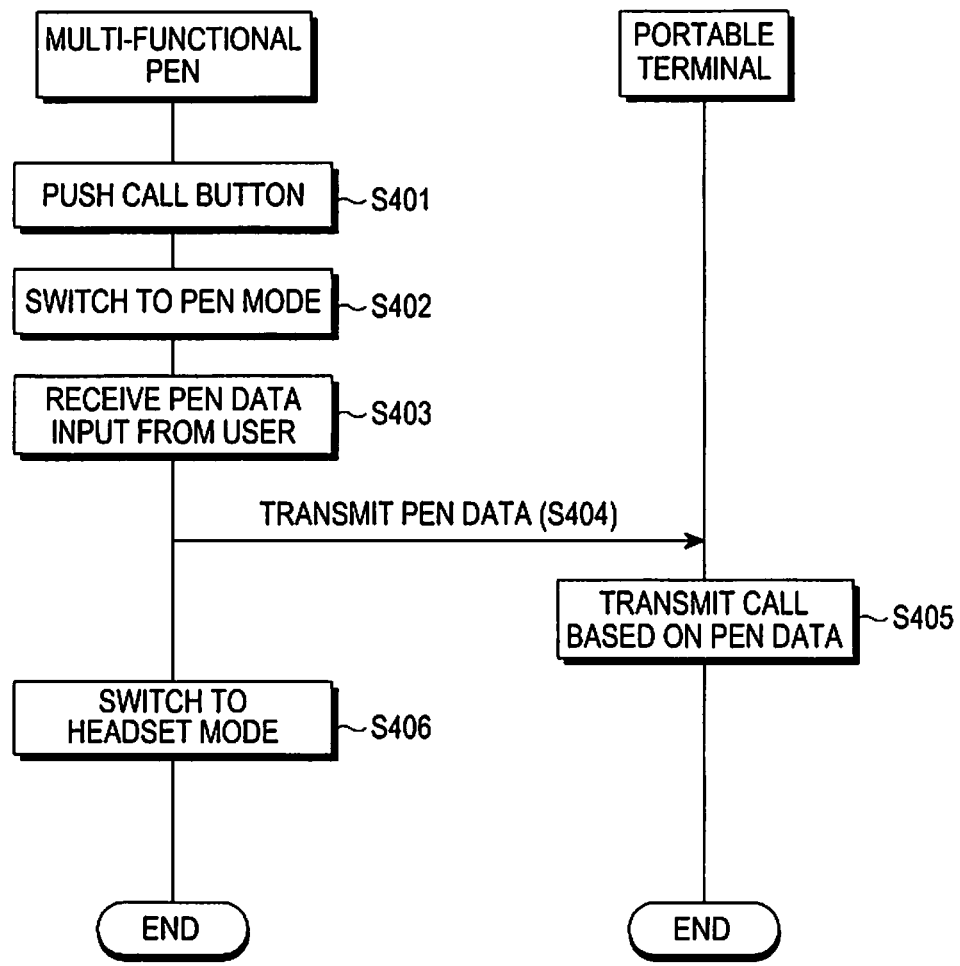
FIG. 4 is flowchart illustrating a method for using the multi-functional pen, according to an embodiment of the present invention.
Figure 5:
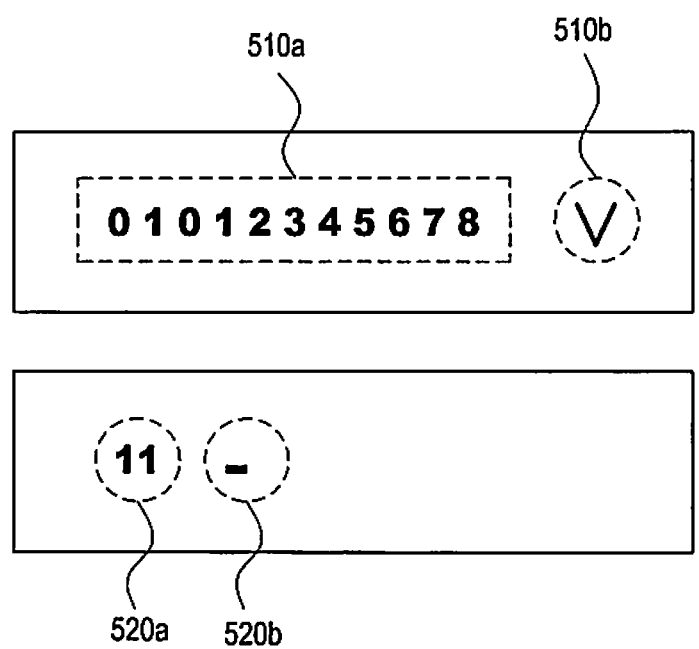
FIG. 5 is a schematic diagram illustrating a method for using the multi-functional pen, according to an embodiment of the present invention.

FIG. 4 is flowchart illustrating a method for using the multi-functional pen 200, according to an embodiment of the present invention. FIG. 5 is a schematic diagram for describing the method for using the multi-functional pen 200, according to an embodiment of the present invention.

The current embodiment of the present invention is further described as follows, with reference to FIGS. 2 to 5. In the present example, it is assumed that the multi-functional pen 200 and the portable terminal 100 have completed communication setup (e.g., established a Bluetooth connection through a Bluetooth pairing) before step S401.

Referring to FIG. 4, when the controller 210 confirms, in step S401, that the call button 234 has been pushed by the user, the controller 210 switches an operation mode of the multi-functional pen 200 to the pen mode in step S402.

More specifically, the user can perform a request by pushing the call button 234, so that the operation mode of the multi-functional pen 200 is switched to the pen mode, the controller 210 can transmit information regarding switching to the pen mode of the multi-functional pen 200 to the portable terminal 100, and the portable terminal 100, which has received the information, waits for transmission of pen data of the multi-functional pen 200 input in the pen mode.

Although steps S401 and S402 are described hereinabove such that the operation mode of the multi-functional pen 200 is switched to the pen mode according to the push of the call button 234, the operation mode may be switched to the pen mode according to the push of the mode switch button 235 shown in FIG. 3, in accordance with embodiments of the present invention.

Referring back to FIG. 4, the controller 210 receives pen data input by the user in step S403 and controls the pen data to be transmitted to the portable terminal 100 in step S404, and the portable terminal 100 transmits a call based on the transmitted pen data in step S405.

Steps S403 to S405 are described in more detail as follows with reference to FIG. 5. The user can request for transmission of a call to a predetermined number (i.e., 01012345678) 510a of FIG. 5 by pushing the call button 234 shown in FIG. 3 after inputting the predetermined number through the multi-functional pen 200 switched to the pen mode.

According to a modification of the above-described embodiment of the present invention, in steps S403 and S404, a call may be transmitted through a gesture input of a predetermined type instead of the push of the call button 234.

For example, if pen data of a gesture 510b is input after pen data of the number 510a shown in FIG. 5 is input, the portable terminal 100 can determine that transmission of a call to the number (i.e., 01012345678) 510a has been requested and transmit a call to the requested number.

Meanwhile, a quick dial function of transmitting a call by registering a telephone number corresponding to each quick dial number and inputting only a quick dial number may also be provided in a portable terminal according to embodiments of the present invention. For example, if pen data of a gesture 520b after only a small number of digits corresponding to a quick dial number 520a are input, the portable terminal 100 can recognize the corresponding number (i.e., 11) as a quick dial number and transmit a call to a telephone number corresponding to the quick dial number (i.e., 11). If pen data of a number and pen data of a gesture are input from the user, it is determined that the input gesture corresponds to a call transmission request to the input number. When transmission of a call is requested by inputting pen data of a gesture, a call transmitted to an input full number (e.g., the number of 510a) is distinguished from a call transmitted to a quick dial number of an input number (e.g., the number of 520a) by identifying a type of the input gesture. In the present example, it is assumed that telephone numbers corresponding to quick dial numbers are stored in a memory of the portable terminal 100.

Referring back to FIG. 4, the controller 210 of the multi-functional pen 200 controls the operation mode of the multi-functional pen 200 to be switched to the headset mode in step S406.

As described above with respect to steps S403 to S405, a user may receive a call transmission service provided by the portable terminal 100 by inputting a full number (e.g., 01012345678) of the other party or a number corresponding to a quick dial number (e.g., 11). According to an embodiment of the present invention, after steps S403 to S405, the user can receive the call transmission service by using the multi-functional pen 200 without a separate operation by automatically switching the operation mode of the multi-functional pen 200 to the headset mode.

In addition to the embodiment of the present invention described herein with reference to FIG. 4, if a call is received when the multi-functional pen 200 is operating in the pen mode or the mouse mode, the portable terminal 100 may inform the multi-functional pen 200 of the call reception, and the multi-functional pen 200 may inform the user of the call reception through the LED 236 or the vibration motor. Thereafter, the user may request a call connection with a call transmission party by pushing the call button 234 of inputting a predetermined gesture (e.g., the gesture 510b or 520b in the pen mode) in response to the call reception. When the user requests the call connection, the multi-functional pen 200 may automatically switch the operation mode of the multi-functional pen 200 to the headset mode.

Figure 6:
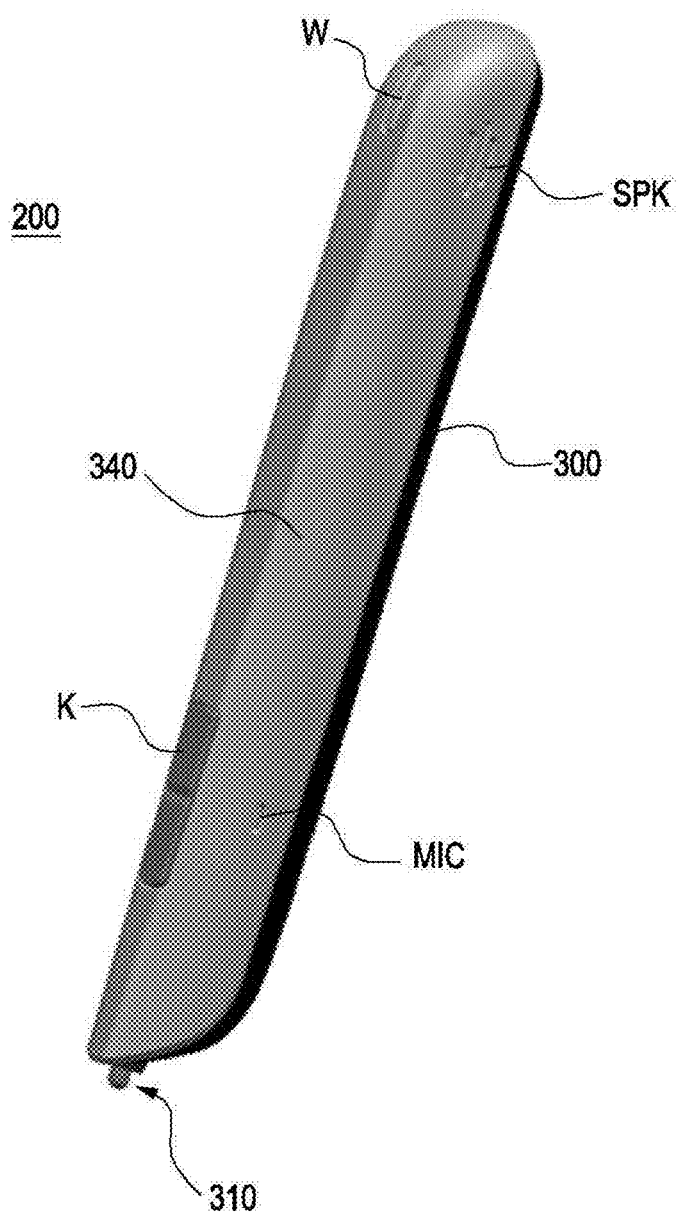
FIG. 6 is a perspective view of the appearance of the multi-functional pen according to an embodiment of the present invention.
Figure 7:
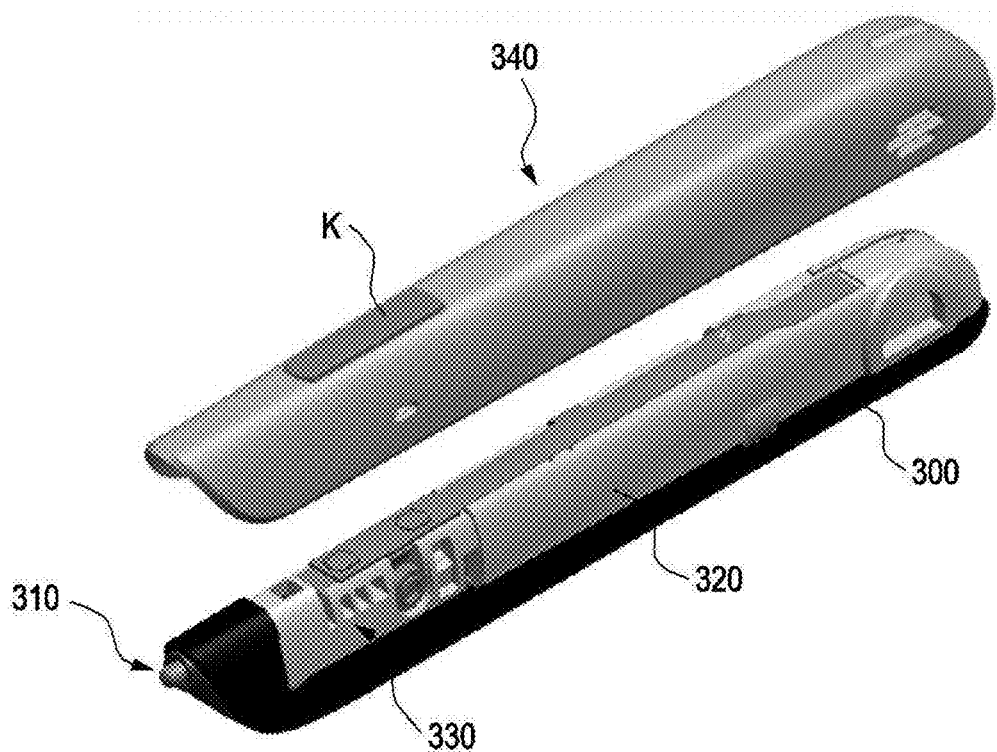
FIG. 7 is an exploded perspective view of an assembled lower case and an outer case assembly of the multi-functional pen according to an embodiment of the present invention.

As shown in FIGS. 6 and 7, the multi-functional pen 200 may be a pen type and may be used as a stylus pen, a mouse, or a headset device, for example. The multi-functional pen 200 ostensibly includes a lower case 300 extended in a lengthwise direction and an outer case assembly 340 and 350 assembled with the lower case 300, wherein a pen tip compartment 310 and the microphone MIC are disposed in one end of the multi-functional pen 200, while the speaker SPK is disposed in the other end thereof. In FIGS. 6 and 7, "K" denotes an upper key, and "W" denotes an LED window. FIG. 7 further illustrates a right case 320.

Figure 8:
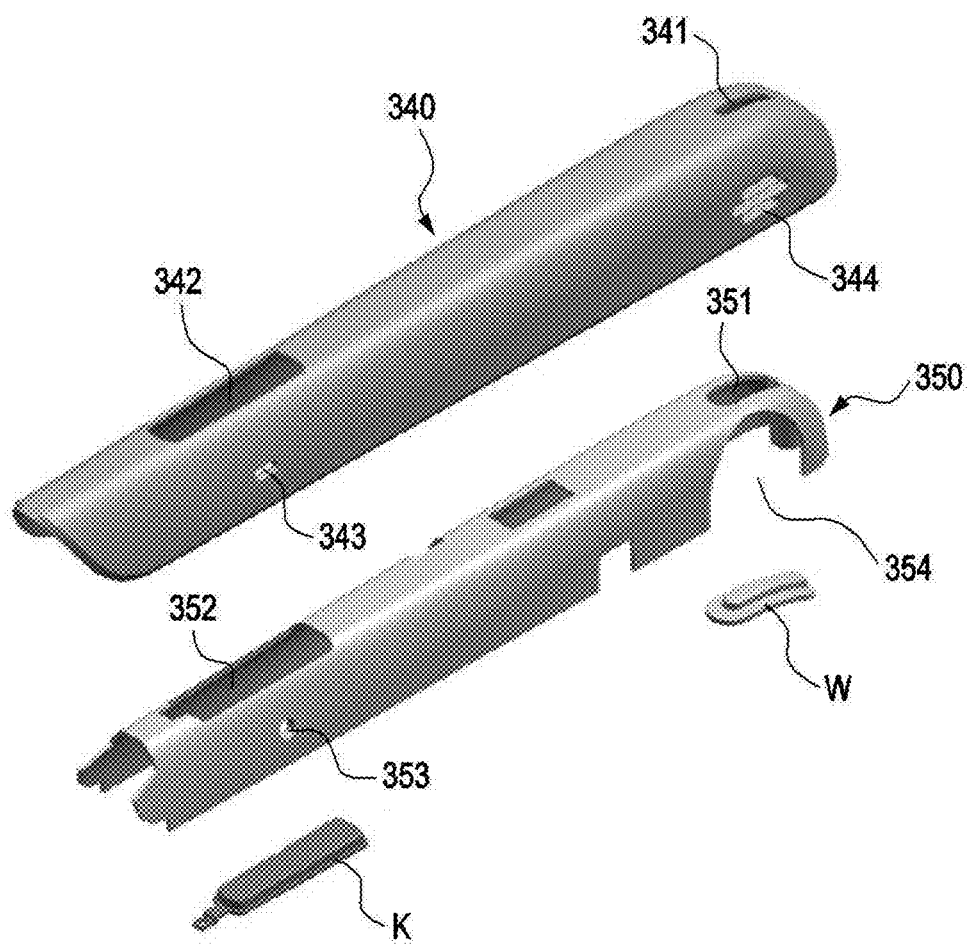
FIG. 8 is an exploded perspective view of the outer case assembly according to an embodiment of the present invention.
Figure 10:
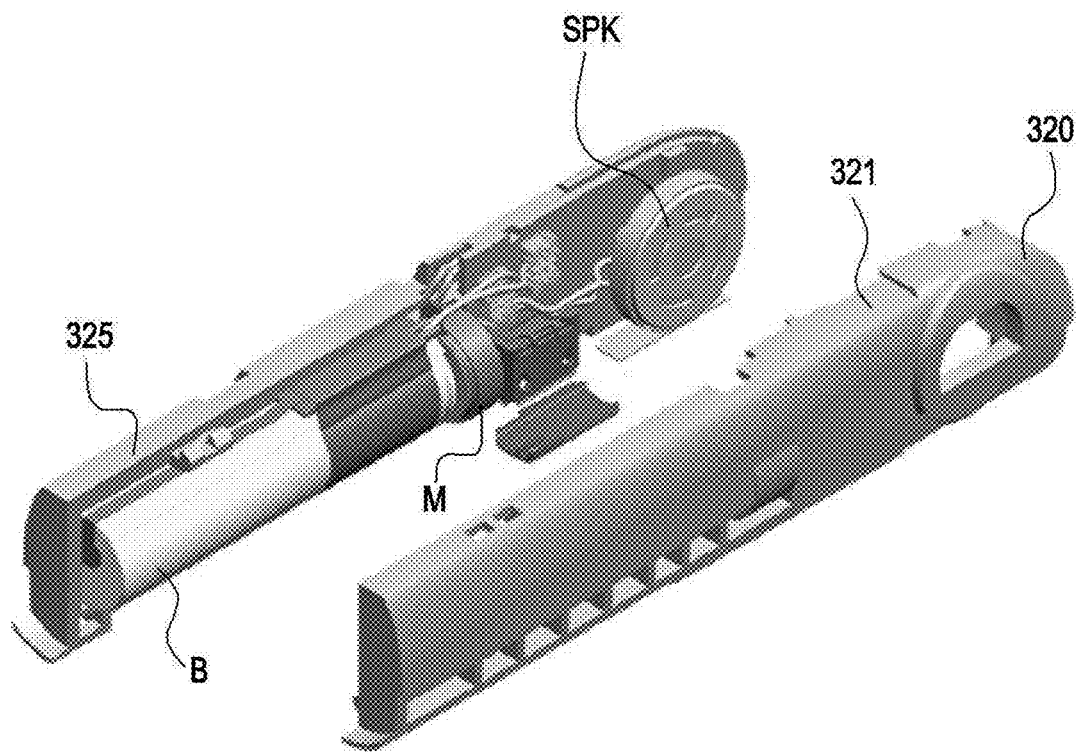
FIG. 10 is an exploded perspective view of a battery, a motor, and a speaker mounted in the left and right cases according to an embodiment of the present invention.
Figure 13:
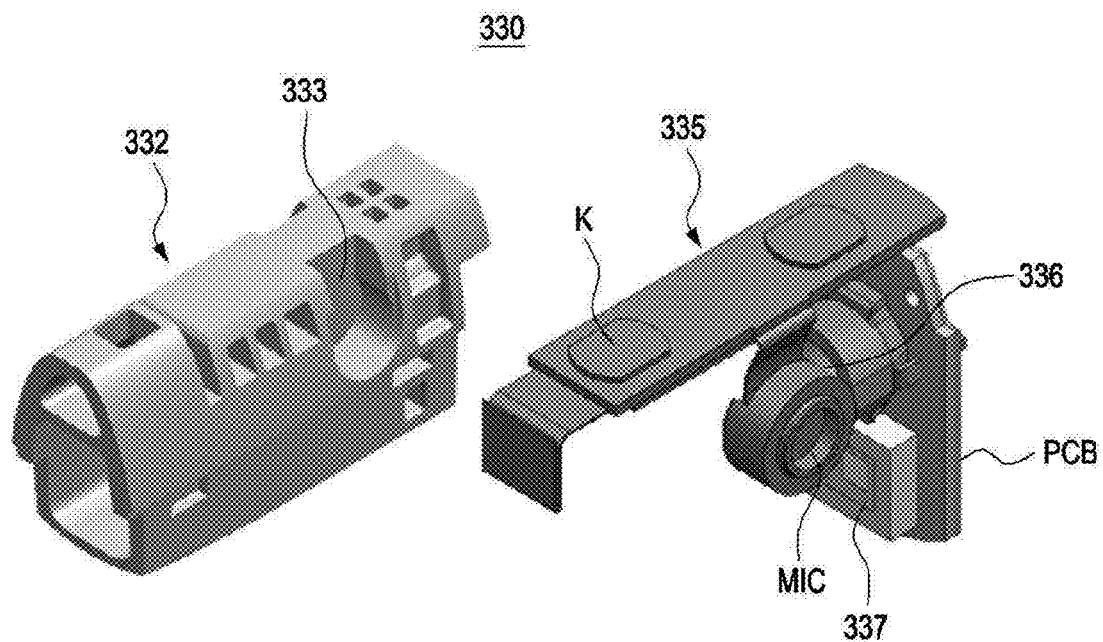
FIG. 13 is an exploded perspective view of the optical module according to an embodiment of the present invention.

As shown in FIG. 8, the outer case assembly 340 and 350 is a housing covering the outer surfaces of left and right cases 325 and 320, which are described in further detail herein with reference to FIG. 10, and an optical module 330, which is described further herein with reference to FIG. 13. The outer case assembly includes an outer case 340 and an inner case 350, which is assembled to be closely attached to the inner surface of the outer case 340 and faces the outer surfaces of the left and right cases 325 and 320 and the optical module 330. The inner case 350 includes an opening for the LED window W, an opening 352 for the upper key K, and openings 353 and 354 for transmitting sounds for the microphone MIC and the speaker SPK, respectively.

Figure 9:
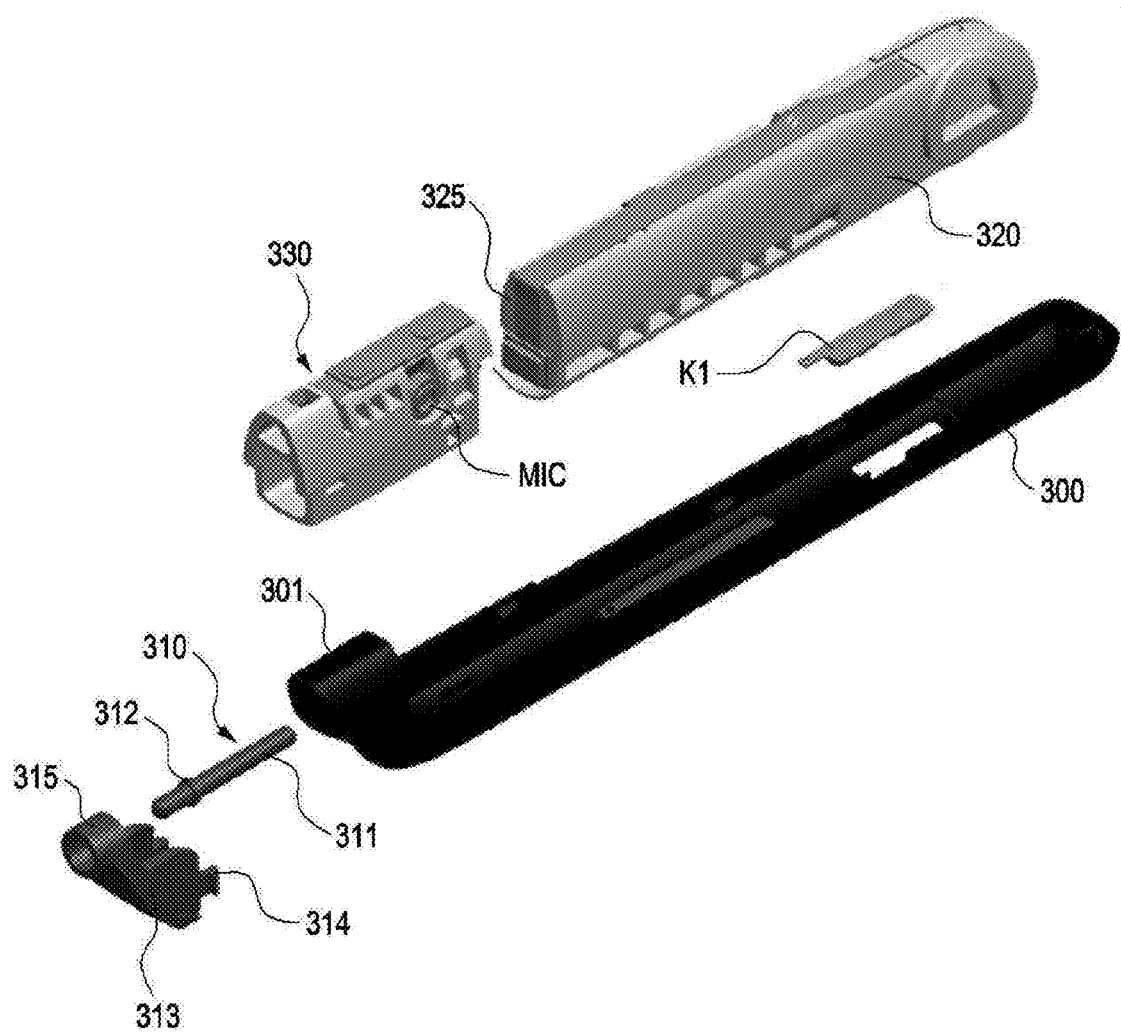
FIG. 9 is an exploded perspective view of a pen tip compartment, an optical module, and left and right cases assembled in the lower case according to an embodiment of the present invention.

As shown in FIG. 9, the pen tip compartment 310, the optical module 330, and the left and right cases 325 and 320 are sequentially disposed on the lower case 300. The left and right cases 325 and 320 are assembled on one end of the lower case 300, and the pen tip compartment 310 and the optical module 330 are on the other end thereof independently to the left and right cases 325 and 320. The optical module 330 is disposed between the left and right cases 325 and 320 and the pen tip compartment 310.

The pen tip compartment 310 includes a pen tip 311, which includes a hindrance protrusion 312 in a predetermined position of the circumference of the pen tip compartment 310 and is assembled with one end 301 of the lower case 300 in the length direction, and a window 313, which holds the assembled pen tip 311 onto the one end 301 and fixes the assembled pen tip 311 to expose a portion of the assembled pen tip 311. The window 313 is an InfraRed (IR) window acting as a filter for passing only a specific wavelength, is assembled with the one end 301 of the lower case 300 by including a pair of hooks 314 backwards, and includes a central-hole type tip housing 315 for protecting the exposed portion of the assembled pen tip 311. In FIG. 9, "K1" denotes a lower key. The window 313 stably holds the pen tip 311 to the one end 301 and acts as a filter for passing only a specific wavelength transmitted through a lens 336. According to the embodiment of the present invention, pen tip 311 may further includes an elastic body in the hindrance protrusion 312 for shock absorption, in case the multi-functional pen falls to the ground or some other surface.

Figure 11:
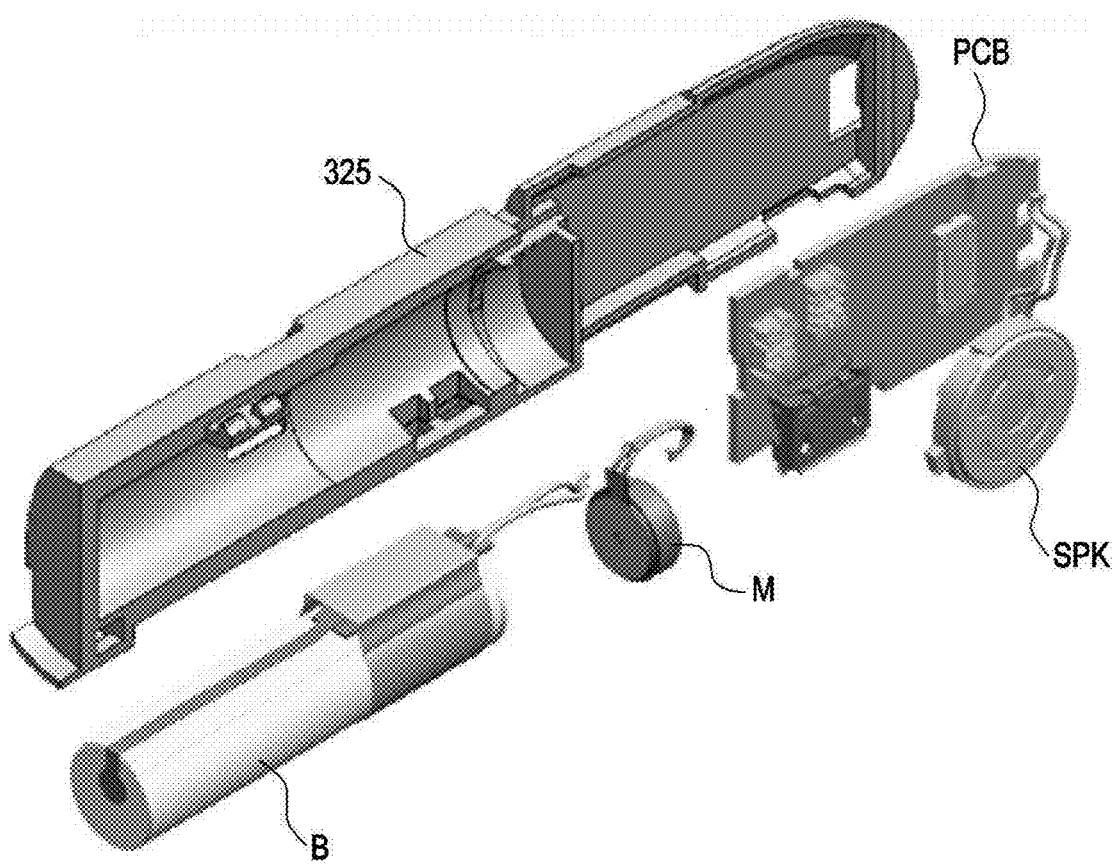
FIG. 11 is an exploded perspective view of the battery, the motor, and the speaker mounted in the left case according to an embodiment of the present invention.

As shown in FIGS. 10 and 11, the left and right cases 325 and 320 enclose a cylindrical battery B, a motor M disposed next to the battery B along the length direction, and the speaker SPK disposed next to the motor M along the length direction. The battery B, the motor M, and the speaker SPK are electrically connected to a main Printed Circuit Board (PCB). The left and right cases 325 and 320 are assembled through hooks.

Figure 12:
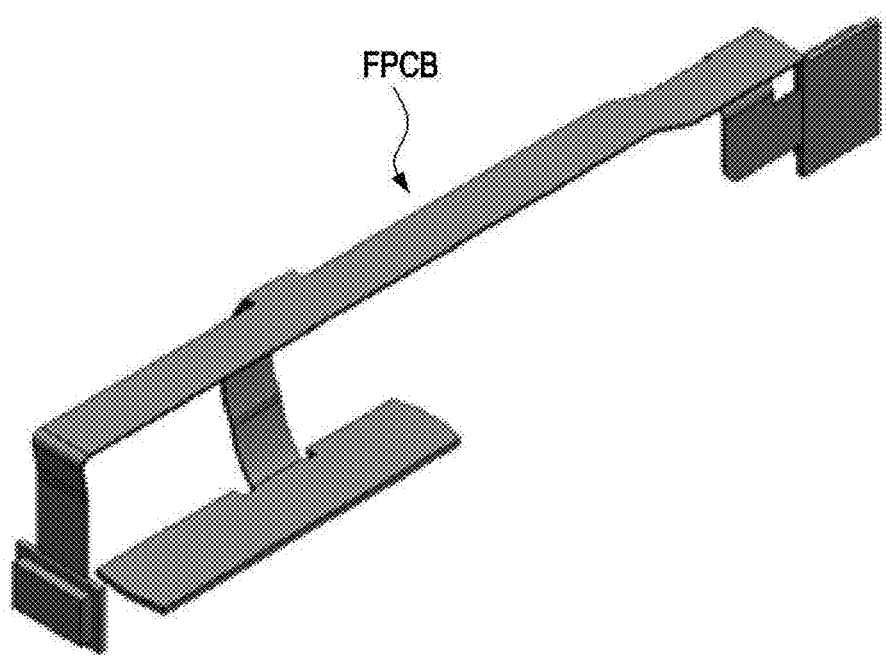
FIG. 12 is an exploded perspective view of a flexible printed circuit board mounted in the right case according to an embodiment of the present invention.

As shown in FIG. 12, the parts enclosed in the left and right cases 325 and 320 are connected to each other through a Flexible PCB (FPCB), and a groove 321 (illustrated in FIG. 10) for stably placing the FPCB is formed on the upper side of the right case 320.

As shown in FIG. 13, the optical module 330 includes an optical frame 332 and an optical assembly 335 assembled with the optical frame 332. The optical frame 332 is a central-hole type frame of which an inner space is extended in the length direction and includes an opening 333 for passing a sound for the microphone MIC in one end of the optical frame 332. The optical assembly 335 includes the upper key K disposed in the upper side of the optical assembly 335, the microphone MIC exposed in one end of the optical assembly 335, a lens 336 disposed inside the optical frame 332, and a sensor 337 disposed beside the lens 336. The microphone MIC is disposed to face an external direction, the sensor 337, which is a navigation sensor, is oriented in a direction perpendicular to the microphone MIC and disposed to be oriented to the pen tip 311, and the lens 336 is disposed in parallel to the sensor 337 and disposed to be oriented to the pen tip 311. An arrangement of the sensor 337 with respect to the lens 336 is further described herein below.

Figure 14:
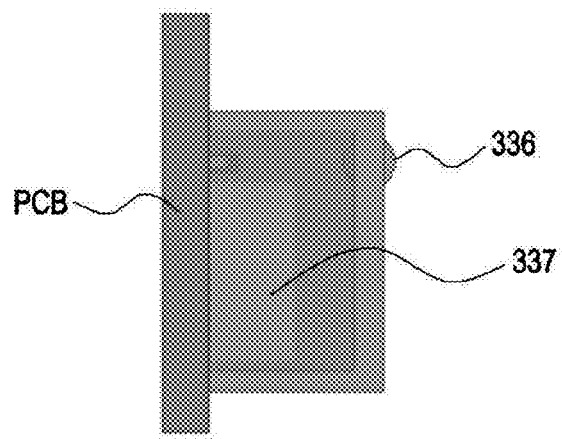
FIG. 14 is a side view of a lens and a sensor equipped in the multi-functional pen according to an embodiment of the present invention.

As shown in FIG. 14, the sensor 337 and the lens 336 according to an embodiment of the present invention may be configured on a PCB in a one body, through optical module miniaturization. The structure in which the sensor 337 and the lens 336 are disposed on one PCB has advantages that an installation space can be minimized and a manufacturing process can be simplified.

Figure 15:
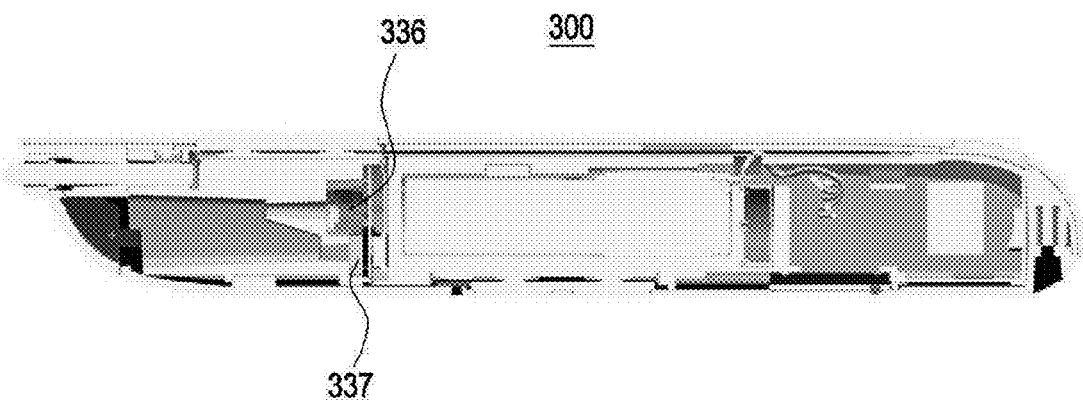
FIG. 15 is a cross-sectional view of the multi-functional pen according to an embodiment of the present invention.
Figure 16:
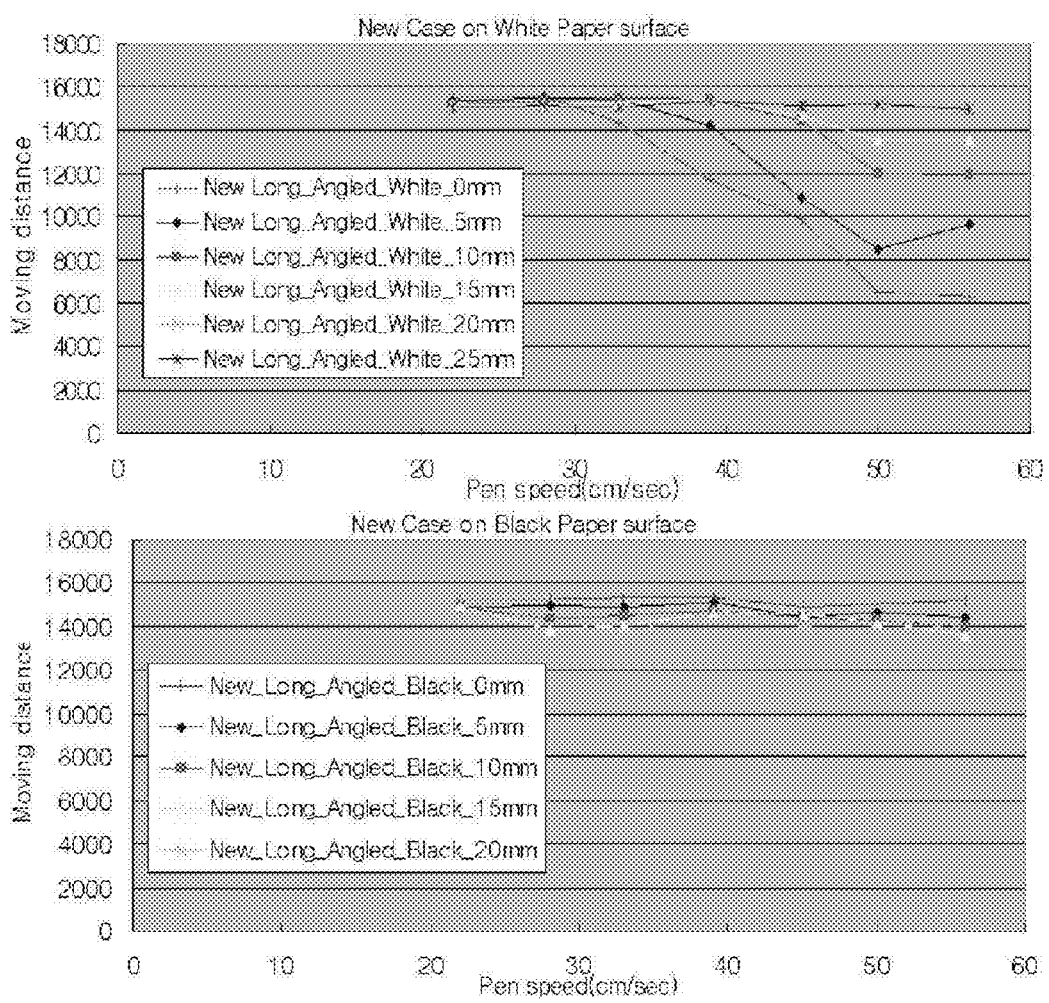
FIG. 16 is a graph illustrating optical characteristics shown on white paper and black paper when an inclined angle between the lens and the sensor is 0° in the multi-functional pen according to an embodiment of the present invention.
Figure 17:
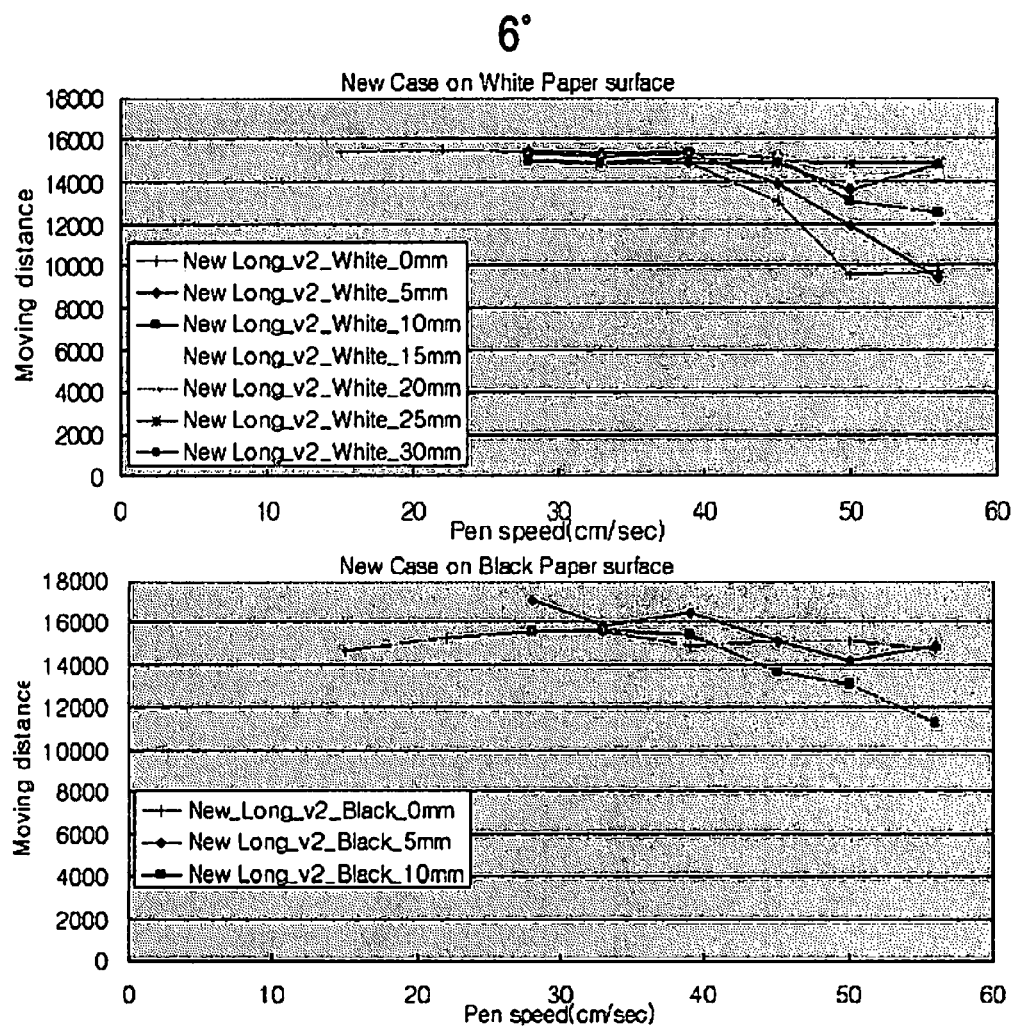
FIG. 17 is a graph illustrating optical characteristics shown on white paper and black paper when the inclined angle between the lens and the sensor is 6° in the multi-functional pen according to an embodiment of the present invention.

If the sensor 337 and the lens 336 according to an embodiment of the present invention are disposed in parallel in a pen tip direction as shown in FIG. 15, optical characteristics on black paper are much better than those on white paper as shown in FIG. 16, and if the sensor 337 is disposed to be inclined by 6° based on the lens 336, optical characteristics on white paper are much better than those on black paper as shown in FIG. 17. According to an arrangement relationship between the sensor 337 and the lens 336, the optical characteristics shown on white paper and black paper differ. The graphs shown in FIGS. 16 and 17 show that optical characteristics are excellent as flatness is high.

As described above, a multi-functional pen according to embodiments of the present invention can be used as a stylus pen used to input data with the appearance of the multi-functional pen formed in a pen type and also be used as a portable device having both a mouse function and a headset function by disposing an optical module, a speaker, and a microphone with the right component in the right place. Further, in the multi-functional pen, a window acts as a filter and stably holds a pen tip onto one end of a lower case of the multi-functional pen with a simple insertion operation in a process of assembling the pen tip. Therefore, according to embodiments of the present invention, a portable terminal can be used conveniently and efficiently.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A method for processing data by a multi-functional pen, the method comprising:
   switching an operation mode of the multi-functional pen to a pen mode according to a predetermined key input;
   receiving a command, inputted to the multi-functional pen from a user in the pen mode, wherein an input data includes one or more characters, and inputted to a portable terminal;
   transmitting the command to the portable terminal,
   wherein the portable terminal processes the input data by applying the command to the input data;
   if the transmission of the command is completed, ending the pen mode and switching the operation mode of the multi-functional pen to a headset mode; and
   in the headset mode, receiving sound data transmitted from the portable terminal and outputting sound based on the sound data via a speaker of the multi-functional pen.

2. The method of claim 1, wherein the predetermined key input is a key input of a call button included in the multi-functional pen.

3. The method of claim 1, wherein receiving the command includes receiving a key input for requesting a call connection by dialing a telephone number if the input data is related to the telephone number.

4. The method of claim 1, wherein receiving the command includes receiving gesture, as a first data, for requesting a call connection by dialing a telephone number if the input data is related to the telephone number.

5. The method of claim 1, wherein receiving the command includes receiving gesture, as a first data, for requesting a call connection by dialing a telephone number if the input data is related to the telephone number, and
   wherein the portable terminal determines the input data as a quick dial number corresponding to the telephone number and makes a call to the telephone number.

6. The method of claim 1, further comprising, if the transmission of the command is completed, ending the pen mode and switching the operation mode of the multi-functional pen to a headset mode.

7. The method of claim 1, further comprising:
   informing, if the portable terminal makes a call corresponding to the input data according to the command, the user that the call is made by the portable terminal.

8. A multi-functional pen for processing data, comprising:
   a controller configured to switch an operation mode of the multi-functional pen to a pen mode according to a predetermined key input;
   an input sensor configured to receive a command, inputted to the multi-functional pen from a user in the pen mode, wherein an input data includes one or more characters; and
   a communication circuit configured to transmit the command to a portable terminal,
   wherein the portable terminal processes the input data by applying the command to the input data, and
   wherein, the controller is further configured to:
   if the transmission of the command is completed, end the pen mode and switch the operation mode of the multi-functional pen to a headset mode, and
   control, in the headset mode, the communication circuit to receive sound data transmitted from the portable terminal and output sound based on the sound data via a speaker of the multi-functional pen.

9. The multi-functional pen of claim 8, wherein the predetermined key input is a key input of a call button included in the multi-functional pen.

10. The multi-functional pen of claim 8, wherein the controller is configured to control the communication circuit to receive a key input for requesting a call connection by dialing a telephone number if the input data is related to the telephone number.

11. The multi-functional pen of claim 8, wherein the controller is configured to control the input sensor to receive a gesture, as a first data, for requesting a call connection by dialing a telephone number if the input data is related to the telephone number.

12. The multi-functional pen of claim 8, wherein the controller is configured to control the input sensor to receive a gesture, as a first data, for requesting a call connection by dialing a telephone number if the input data is related to the telephone number, and
   wherein the portable terminal determines the input data as a quick dial number corresponding to the telephone number and makes a call to the telephone number.

13. The multi-functional pen of claim 8, wherein the controller is further configured to inform the user that a call is made by the portable terminal if the portable terminal makes the call corresponding to the input data according to the command.

* * * * *